United States Patent [19]

Cocci et al.

[11] 4,002,834
[45] Jan. 11, 1977

[54] PCM SYNCHRONIZATION AND MULTIPLEXING SYSTEM

[75] Inventors: James Alfred Cocci, Leominster, Mass.; Maurice L. Schiff, Fort Wayne, Ind.

[73] Assignee: The United States of America as represented by the Secretary of the Navy, Washington, D.C.

[22] Filed: Dec. 9, 1974

[21] Appl. No.: 530,794

[52] U.S. Cl. .................. 178/69.1; 325/38 R; 325/65
[51] Int. Cl.² .............. G06F 11/12; G08C 25/00
[58] Field of Search ............. 178/69.5 R, 69.5 F, 178/68, 58, DIG. 3; 179/15.55 R, 15.3 W, 15.3 V, 15.3 S; 325/65, 38; 343/179; 340/146.1 D

[56] References Cited

UNITED STATES PATENTS

| | | | |
|---|---|---|---|
| 3,404,231 | 10/1968 | Aaron et al. | 178/69.5 R |
| 3,549,804 | 12/1970 | Greenspan et al. | 178/69.5 R |
| 3,571,794 | 3/1971 | Tong | 178/69.5 R |
| 3,627,946 | 12/1971 | Inoue et al. | 325/38 |
| 3,737,778 | 6/1973 | Van Gerwen et al. | 178/88 |
| 3,765,013 | 10/1973 | Leibowitz | 340/146.1 D |
| 3,777,066 | 12/1973 | Nicholas | 178/69.5 R |
| 3,783,383 | 1/1974 | Forster et al. | 178/69.5 R |
| R27,810 | 11/1973 | Buehrle | 178/68 |

*Primary Examiner*—Malcolm A. Morrison
*Assistant Examiner*—Errol A. Krass
*Attorney, Agent, or Firm*—R. S. Sciascia; G. J. Rubens; H. Fendelman

[57] ABSTRACT

A system for communicating digital data which utilizes a synchronization scheme in which a transmitter transmits a binary 1 followed by $n$ data bits which are followed by $n + 1$ binary 0's and in which a receiver is synchronized with the transmitter by generation of a master clock in response to receipt of the transmitted binary 1 and by initiation of a frame pulse having a pulse duration equal to the duration of the incoming data frame.

17 Claims, 9 Drawing Figures

FIG. 7 is a block diagram of the decoder of the present invention for retrieval of time multiplexed signals.

PCM SYNCHRONIZATION AND MULTIPLEXING SYSTEM

BACKGROUND OF THE INVENTION

Spread spectrum transmission is rapidly gaining popularity in the field of communications due to its direct application to the problem of minimization of hostile detection and jamming. Several types of audio transceivers utilize pulse code modulated (PCM) type signals. These transceivers require equipment for determining which groups of bits from a stream of digital data which represents a PCM signal constitute individual data frames. Existing equipment for accomplishing this employs periodic transmission of a coded bit group that is used to synchronize system timing and data retrieval. Such equipment requires complex pattern recognition hardware at the receiver and results in a loss of a significant amount of data in the event of transmission error.

SUMMARY OF THE INVENTION

The present invention provides a simple and reliable method of obtaining transmitter-receiver synchronization in an audio transceiver which employs pulse code modulation. The present invention also provides the capability of demultiplexing, time multiplexed signals on the same data channel. At the transmit side of the communications system, a signal is quantized and pulse code modulated to $n$ bits. Each transmitted data frame contains these $n$ bits preceded by a binary 1 and followed by $n + 1$ binary 0's. At the receiver side of the communications system, the first received binary 1 initiates generation of a frame pulse, the width of which is slightly greater than $nT$ where $T$ is the pulse period of the transmitter and receiver clocks. The leading edge of the frame pulse enables the receiver master clock, the output of which shifts the serially received data into a receiver shift register, and the trailing edge of the frame pulse enables a receiver buffer register which accepts the data from the receiver shift register in parallel form. The same synchronization concept may, according to the present invention, be used for demultiplexing of time multiplexed signals as will be described below.

The problem of determining which groups of bits from a stream of digital data representing a PCM signal constitute individual data frames is thus solved by the technique of the present invention in an inexpensive and reliable manner.

DESCRIPTION OF THE PREFERRED EMBODIMENTS

Figure 1:
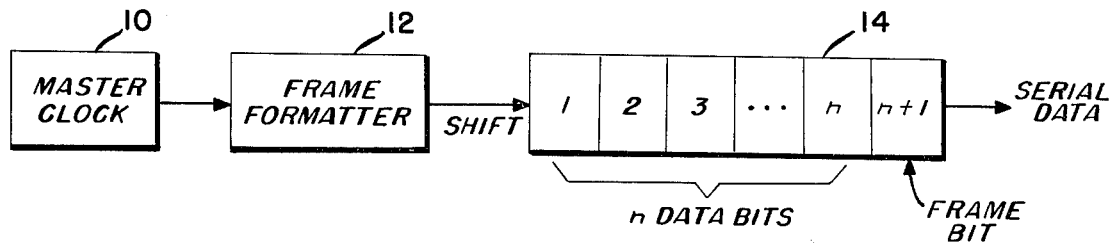
FIG. 1 is a block diagram of the encoder section of the present invention.
Figure 2:
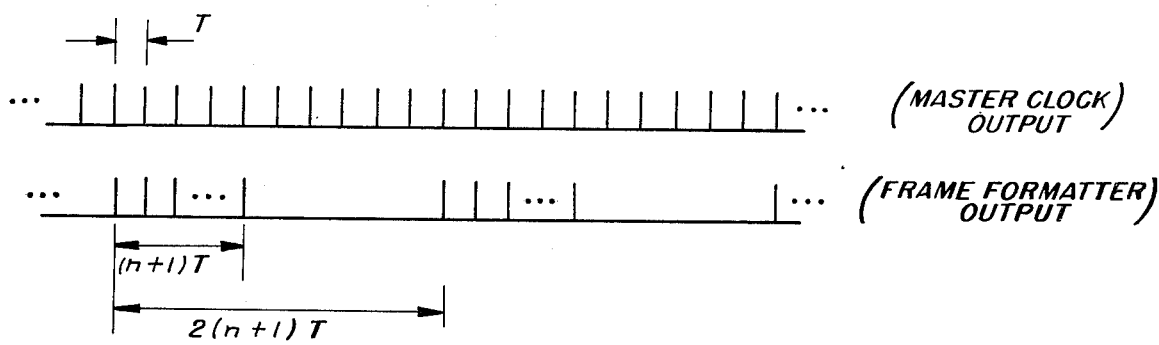
FIG. 2 is an illustration of the encoder timing.
Figure 3:
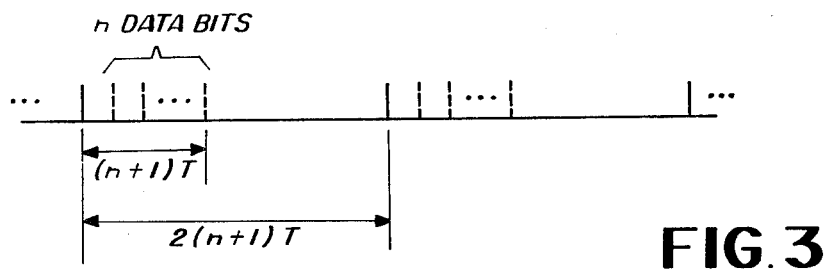
FIG. 3 is an illustration of the serial data format outputted by the encoder of FIG. 1.

A block diagram of the encoder of the present invention is illustrated in FIG. 1. Master clock generator 10 runs at a fixed rate with pulse period T. The signal from master clock 10 is modified by a "frame formatter" 12, illustrated in detail in FIG. 1A, which selects an individual frame equal to $2(n + 1)T$ and allows clock pulses to occur only during the first $n + 1$ pulse periods of each frame as is illustrated in FIG. 2. A data shift register 14, which may comprise a parallel-to-serial converter is loaded from a data source 13 (FIG. 1B) with n bits of data derived from a quantized, pulse code modulated signal (not shown). The $(n + 1)$th bit of shift register 14 is loaded with a binary 1 or logical "high" state. When the data is shifted out of register 14 by suitable means (not shown), a serial data stream will be created which adheres to the frame format described and will appear as shown in FIG. 3. Thus, the data that is shifted out will comprise a binary 1 followed by $n$ data bits which are derived from the original signal by quantization and pulse code modulation. The $n$ data bits are followed by $n + 1$ 0's so that the frame has a total width of $2(n + 1)T$.

Figure 1A:
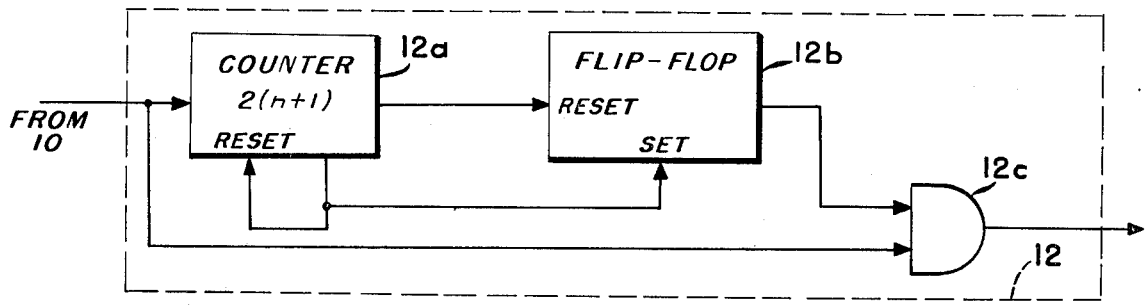
FIG. 1A is a diagram of the "frame formatter" of FIG. 1.

Frame formatter 12 may be implemented as illustrated in FIG. 1A. Counter 12a counts $2(n + 1)$ clock pulses from master clock 10 and then resets itself and sets flip-flop 12b such that the output of 12b is high, enabling AND gate 12c which receives its other input from master clock generator 10. At the $(n + 1)$th pulse as counted by 12a, counter 12a pulses the reset input of flip-flop 12b causing the output to go low and disabling AND gate 12c until the next set pulse is received by flip-flop 12b from counter 12a.

Figure 1B:
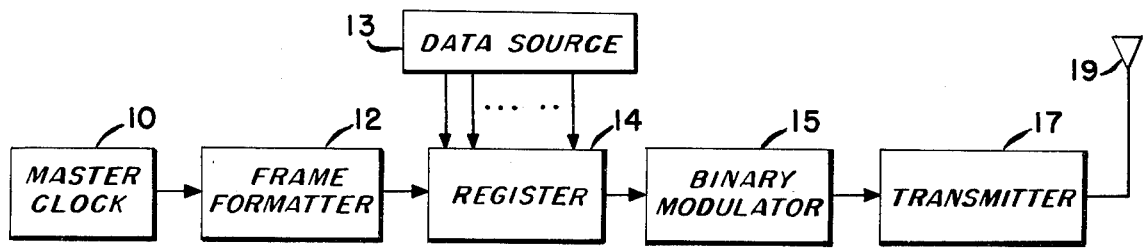
FIG. 1B is a block diagram of the transmitter of the present invention.

As is illustrated in FIG. 1B, the output of register 14 is connected to a transmitter network which may comprise, for example, a binary modulator 15 for PSK (Phase Shift Key), FSK (Frequency Shift Key) or OOK (On-Off Key) modulation followed by a suitable transmitter 17 and an antenna 19. The receiver end of the communication system would likewise comprise an antenna followed by a suitable receiver and binary demodulator (not shown). The serial data output of the demodulator would be furnished to the decoder illustrated in FIG. 4.

Figure 4:
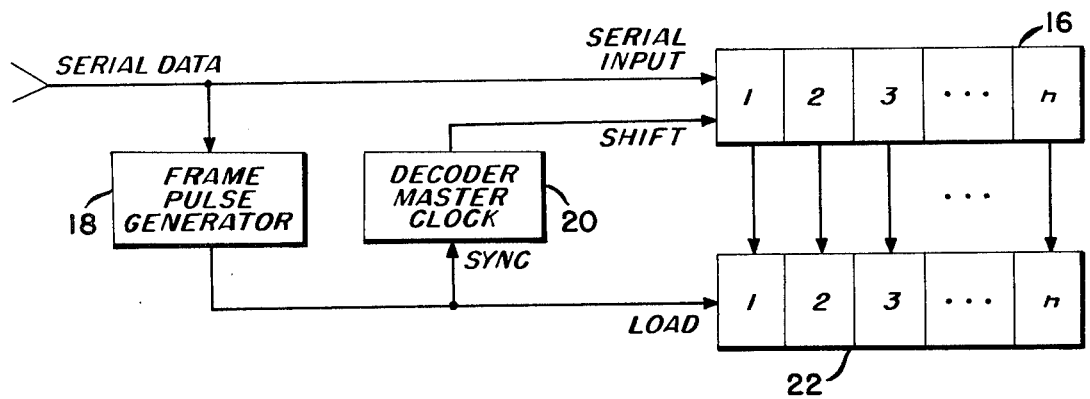
FIG. 4 is a block diagram of the decoder of the present invention.
Figure 5:
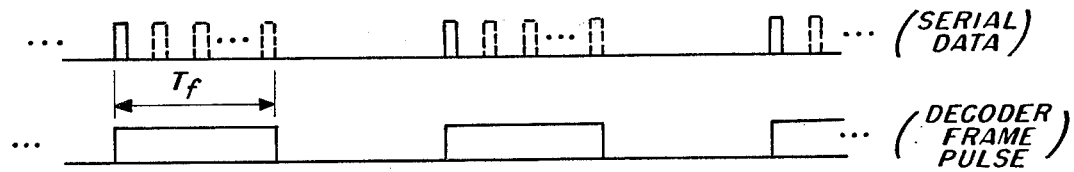
FIG. 5 is an illustration of the decoder frame pulse generation.

As seen in FIG. 4, the incoming signal is fed to a serial input shift register 16 an also to a frame pulse generator 18 which may be a one-shot multivibrator or a counter serially connected to a flip-flop. Upon the receipt of a binary 1, frame pulse generator 18 is triggered and produces an output pulse of width $T_f$ where $nT < T_f < (n + 1)T$, i.e., the trailing edge of $T_f$ occurs during the last of the data pulses, which comprises the $(n + 1)$th slot of the data frame as illustrated in FIG. 5.

The leading edge of this frame pulse is used to synchronize the encoder master clock generator 20 which is designed to synchronize on every $2(n + 1)$ of its pulses. The output of decoder master clock generator 20 is used to pulse the shift register 16 with a clock running at the same fixed rate as encoder master clock 10, with pulse period T, which causes the incoming data to be serially entered into the register 16. The trailing edge of the frame pulse from frame pulse generator 18 is used to trigger parallel loading of the buffer register 22 whereby, assuming that the frame pulse is in fact generated by the first bit of the incoming frame, buffer register 22 is triggered at precisely the time that the n bits of data are present in shift register 16.

If because of a transmission error or a system malfunction, the first bit of a data frame is not sent, the encoder pulse will then be generated by the next available "high" pulse, thus causing loss of synchronization. The "worst case" will occur when the frame pulse is generated by the last data pulse which is in position ($n + 1$) in the data frame. Since the pulse width $T_f$ of the frame pulse is such that $nT < T_f < (n + 1)T$, then the trailing edge of this particular frame pulse will occur at time t, where $(2n + 1)T < t < 2(n + 1)T$ which simply states that the trailing edge of the frame pulse will not overlap the first bit of the next frame. Thus, the next data frame will resynchronize the system, resulting in the loss of synchronization for only one data frame. Therefore, the PCM data is successfully retrieved at the encoder with a minimum loss of information.

Figure 6:
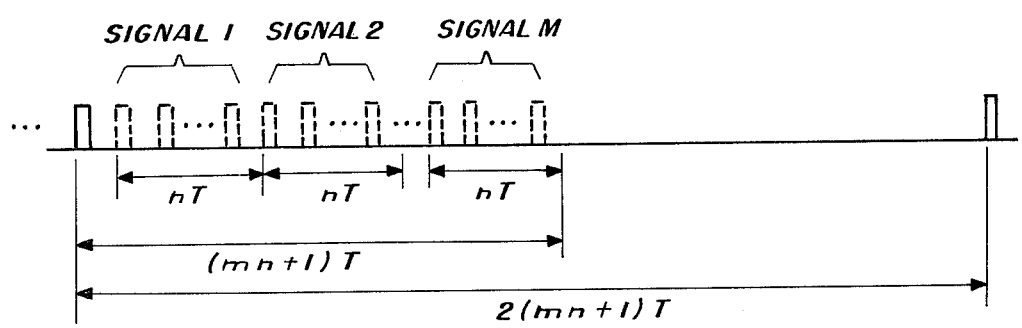
FIG. 6 is an illustration of time multiplexed signals formatted according to the present invention.
Figure 7:
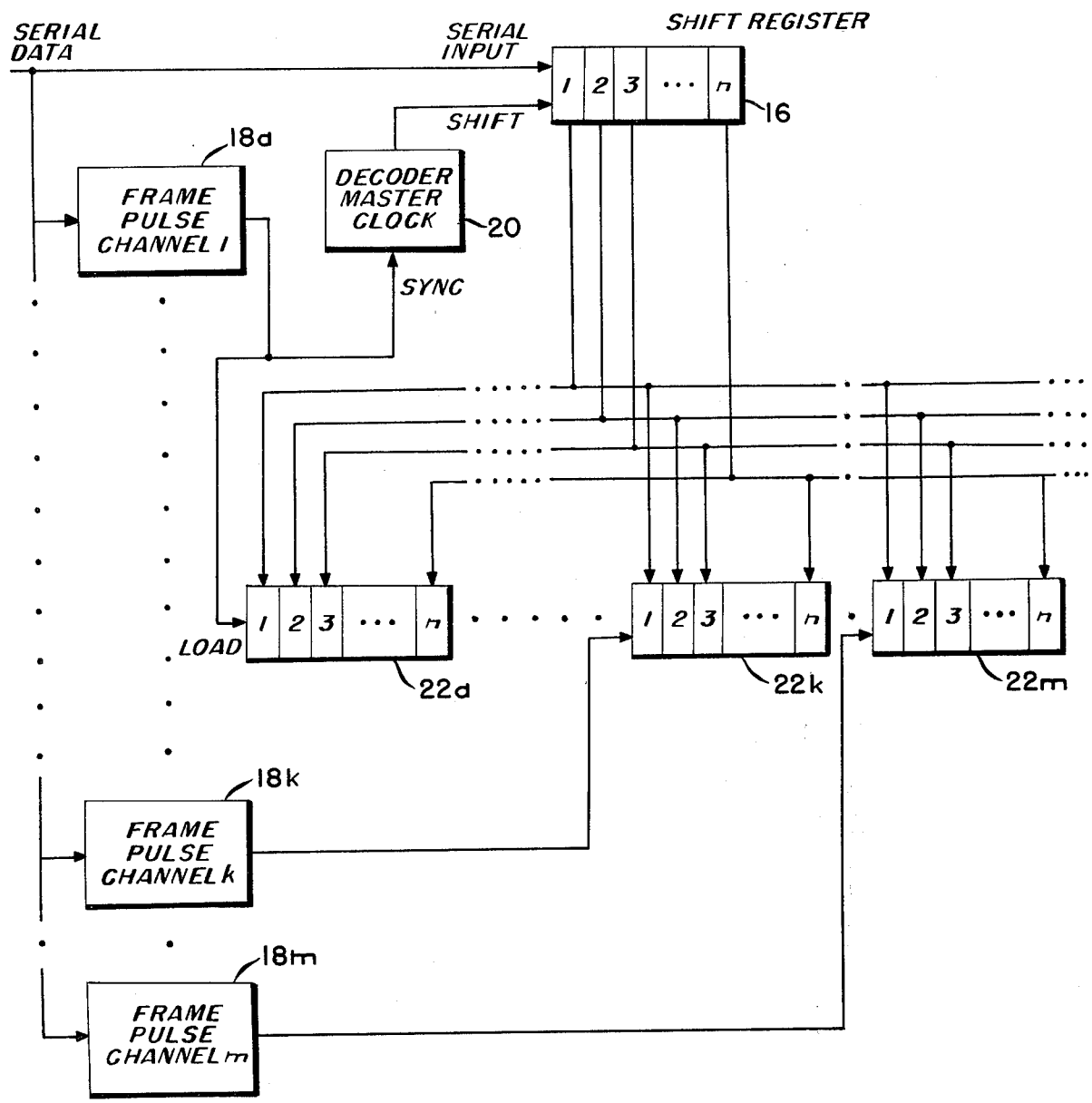

The concept of the present invention may be also used for demultiplexing of time multiplexed signals as is illustrated by the following example. Assume that the transmitted data consists of $m$ time multiplexed signals, each of which is pulse code modulated to $n$ bits. It is to be understood, of course, that this assumption is for example purposes only and that each of the signals could be pulse code modulated to a different number of bits and appropriate modifications to the following equations could obviously be made. Each data frame is structured with the first bit "high" followed by m adjacent groups of n bits each as illustrated in FIG. 6. The total frame length is $2(mn + 1)T$ and the data occupies the first $(mn + 1)$ clock periods of each frame. To retrieve a selected signal $k$, for example, the pulse width of the corresponding encoder frame pulse from frame pulse generator 18 $k$ illustrated in FIG. 7 is adjusted to satisfy the condition $knT < T_f < (kn + 1)T$. The trailing edge of the frame pulse $T_f$ will thus occur during the last pulse of signal $k$ and the $n$ bits of signal $k$ occupying shift register 16 will be transferred to buffer register 22 $k$. Similarly, each of signals $l$ through $m$ will be transferred to appropriate buffer register 22a through 22m upon the occurence of the trailing edge of the frame pulses generated by frame pulse generators 18a through 18m respectively.

As a "worst case" example in the time multiplexed data frame embodiment of FIG. 7, if signal $m$ were desired and the last pulse of signal $m$ triggered the receiver frame pulse, then the trailing edge of the frame pulse would occur at time $t$, where $(2mn + 1)T < t < 2(mn + 1)T$ giving rise to the same resynchronizing phenomenon previously described.

Obviously many modifications and variations of the present invention are possible in the light of the above teachings. It is therefore to be understood that within the scope of the appended claims the invention may be practiced otherwise than as specifically described.

What is claimed is:

1. A method of pulse code modulation communication comprising the steps of
  a. transmitting a plurality of discrete binary 1's;
  b. serially transmitting a group of $n$ data bits representative of a quantized, pulse code modulated signal after each discrete 1 of said plurality of binary 1's;
  c. serially transmitting $n + 1$ binary 0's after each said group of $n$ data bits;
  d. generating a decoder frame pulse in response to receipt of a binary 1;
  e. generating a decoder clock in response to the leading edge of said frame pulse;
  f. pulsing a decoder shift register with said decoder clock to enter each of said groups of n data bits in said decoder shift register;
  g. triggering a buffer register in response to the trailing edge of said frame pulse to load said buffer register with said n data bits from said decoder shift register;
  whereby the maximum time where loss of synchronization between transmission and reception occurs is $2(n + 1)T$, where T is the time between data bits.

2. The method of claim 1 wherein said step of generating a frame pulse includes generating a frame pulse having a width $T_f$ where $nT < T_f < (n + 1)T$.

3. A pulse code modulation communications system comprising:
  first means for outputting encoder clock pulses;
  a data shift register having its shift input connected to said first means for shifting and storing n bits of data derived from a data source plus one additional bit;
  frame pulse generator means for outputting a frame pulse;
  a decoder master clock generator connected to the output of said frame pulse generator;
  a decoder shift register having a shift input connected to said decoder master clock generator and a data input for receiving data from said data shift register;
  buffer register means connected to said decoder shift register and to said frame pulse generator means.

4. The system of claim 3 wherein said first means comprises:
  a master clock generator for generating master clock pulses with pulse period T; and
  frame formatter means for modifying said master clock pulses to produce said encoder clock pulses.

5. The system of claim 4 wherein said frame formatter means modifies said master clock pulses such that said encoder clock pulses occur only during the first $n + 1$ pulse periods out of each $2(n + 1)$ pulse periods of said master clock.

6. The system of claim 3 wherein
  said frame pulse generator means outputs a frame pulse in response to receipt of a logic 1.

7. The system of claim 6 wherein said frame pulse has a width $T_f$ where $nT < T_f < (n + 1)T$.

8. The system of claim 7 wherein said decoder master clock generator generates decoder clock pulses in response to the leading edge of said frame pulse.

9. The system of claim 8 wherein said decoder clock pulses have a pulse period T.

10. The system of claim 7 wherein said buffer register means is triggered by the trailing edge of said frame pulse to receive data from said decoder shift register.

11. The system of claim 3 wherein said frame pulse generator means comprises a plurality of frame pulse generators and said buffer register means comprises a plurality of buffer registers.

12. A pulse code modulation encoder comprising:
  clock means for generating master clock pulses with pulse period T;
  frame formatter means connected to said clock means for modifying said master clock pulses such that said clock pulses occur only during the first $n$ + 1 pulse periods out of each $2(n + 1)$ pulse periods of said master clock;

a data shift register having its shift input connected to said frame formatter means for shifting and storing n bits of data derived from a data source plus one additional bit.

13. A pulse code modulation decoder comprising:
an input terminal for receiving data signals;
frame pulse generator means connected to said input terminal for outputting a frame pulse;
clock means connected to said frame pulse generator means for generating decoder clock pulses;
a shift register having a shift input connected to said clock means and a data input connected to said input terminal;
a buffer register means connected to said shift register and to said frame pulse generator means for receiving data from said shift register.

14. The decoder of claim 13 wherein said frame pulse generator generates said frame pulse in response to receipt of a binary 1.

15. The decoder of claim 14 wherein said buffer register means is triggered by the trailing edge of said frame pulse to receive data from said shift register.

16. The decoder of claim 13 wherein said frame pulse generator means comprises a plurality of frame pulse generators for outputting a plurality of frame pulses, each being of different width.

17. The decoder of claim 16 wherein said buffer register means comprises a plurality of buffer registers.

* * * * *